United States Patent [19]

Yoder

[11] Patent Number: 5,372,811
[45] Date of Patent: Dec. 13, 1994

[54] ANIMAL FEED SUPPLEMENT CONTAINING CO-SPRAY DRIED PLASMA PROTEIN AND AMYLASE

[75] Inventor: Ralph P. Yoder, Fort Dodge, Iowa

[73] Assignee: American Meat Protein Corporation, Ames, Iowa

[21] Appl. No.: 161,130

[22] Filed: Dec. 3, 1993

[51] Int. Cl.$^5$ .................... A23K 1/00; A23L 1/31; A23J 1/00
[52] U.S. Cl. .................... 424/94.6; 426/647; 426/656; 426/2; 424/94.1; 424/530
[58] Field of Search .................... 424/94.1, 94.6, 530; 426/647, 656, 2

[56] References Cited

U.S. PATENT DOCUMENTS

| | | | |
|---|---|---|---|
| 3,974,294 | 8/1976 | Schwille et al. | 426/32 |
| 4,211,795 | 7/1980 | Leroy et al. | 426/2 |
| 4,347,259 | 8/1982 | Suzuki et al. | 426/465 |
| 4,374,860 | 2/1983 | Gasser et al. | 426/28 |
| 4,614,653 | 9/1986 | Kakade | 426/2 |
| 4,623,541 | 11/1986 | Elliot et al. | 424/85 |
| 4,713,250 | 12/1987 | Tonyes et al. | 426/2 |
| 4,729,902 | 3/1988 | Urman et al. | 426/647 |
| 4,804,549 | 2/1989 | Howley et al. | 426/98 |
| 5,011,696 | 4/1991 | Haas et al. | 426/28 |
| 5,066,498 | 11/1991 | McCauley, III | 426/2 |
| 5,085,874 | 2/1992 | Jungvid | 426/41 |
| 5,089,287 | 2/1992 | Michaelson | 426/647 |
| 5,145,706 | 9/1992 | Haji et al. | 426/647 |
| 5,147,642 | 9/1992 | Lotz et al. | 424/94.61 |
| 5,188,825 | 2/1993 | Iles et al. | 424/78.1 |
| 5,198,250 | 3/1993 | Brillhart et al. | 426/2 |
| 5,219,599 | 6/1993 | Cox et al. | 426/104 |
| 5,252,329 | 10/1993 | Nuotio et al. | 424/93 |

*Primary Examiner*—Douglas W. Robinson
*Assistant Examiner*—Jeffrey J. Sevigny
*Attorney, Agent, or Firm*—Zarley, McKee, Thomte, Voorhees, & Sease

[57] ABSTRACT

A feed supplement is disclosed comprising animal plasma protein and a microbial fermentation product of primarily amylase which are blended and spray dried. Animals fed this supplement during the first seven weeks of life experienced an increase in average daily gain of 45%; an increase of feed intake of 7.3%; and an improved feed efficiency of 26% when compared with a control of feed supplemented with animal plasma protein alone.

18 Claims, No Drawings

ANIMAL FEED SUPPLEMENT CONTAINING CO-SPRAY DRIED PLASMA PROTEIN AND AMYLASE

BACKGROUND OF THE INVENTION

It has long been known that the first few weeks of life for animals such as calves or pigs are extremely critical. Often the animals are caught by environmental and health stress, causing them to become weak and dehydrated. Traditionally this occurs during the early growth and weaning period. This condition is many times caused by the inability of the animal to assimilate nutritional elements from the intestine whereby undigested nutrients will end up in the large intestine as a substrate for undesired intestinal bacteria flora which causes diarrhea in the animal.

The total mortality from birth to weaning in normal pig production is generally as high as 20 to 25%. Many of these piglets that die are the object of intense care as they are already underweight and under stress after birth. When the young pig is weaned this is an additional stress factor especially so for the lightest pigs from each litter of pigs.

At birth these pigs have limited enzyme systems efficient only for digestion of milk. The amount of lactase, the enzyme which breaks down and digests milk sugar is high during the first few weeks of life but then decreases shortly after weaning. Meanwhile proteolytic and amylolytic enzymes needed for grain digestion are not fully developed until 4 to 7 weeks of age. Thus feed stuffs other than milk cannot be efficiently digested and absorbed until the animal is several weeks old. Further, abrupt changes in diet and environment are stressful on an animal's digestive system and under stress acids are produced which inhibit natural enzyme production, further aggravating the delicate balance of the system.

The newborn pig does not have a digestive system in which the enzymes which convert complex carbohydrates to glucose, which may be metabolized for energy, are operational. In fact the piglet is characterized as having an energy crisis until he is able to consume and digest complex carbohydrates and proteins from feeds containing grain and protein concentrates. Thus without the essential enzymes to digest and convert several complex carbohydrates into glucose which may be readily used, the pig, suffering from low blood sugar, necessarily begins secondary utilization of plasma amino acids for glucose and energy production. Consequently plasma amino acids and liver storage form of glucose, glycogen (animal starch) begin to be depleted.

Strangely enough giving pure sugar to a piglet which is experiencing these hypoglycemic problems is one of the worse treatments possible. The sugar is too rapidly absorbed (15 to 20 minutes) and causes an overproduction of insulin which plunges the piglet into more severe hypoglycemia than originally existed. The sugar provides an immediate but extremely short lived improvement followed by an insulin response which leaves the piglet worse off than before.

Amino acids and proteins can be converted into glucose very slowly providing long term relief from hypoglycemia and absorbed fatty acids can substitute to a degree for glucose as energy providers without stimulation of insulin production.

Attempts to create a feed stuff for these animals which may be digestible by combining the desired substrates with the enzyme needed for digestion of the substrate, while seemingly an ideal answer to the problem, have to date proved largely unsuccessful. One such product included supplemental enzymes from a microbial fermentation product in a barley and corn wheat based pig starter diet. This enzyme blend added to feed was run in trials on 4-week old pigs and no differences in pig performance due to enzyme supplement were seen. (C. W. Newman, et al Improvement of Pig Performance with Supplemental Enzymes and Microbial Fermentation Products, Abstract, Journal of Agricultural Science 292. Other studies done at Oklahoma State University experienced similar results.

The present invention relates to an animal feed substance and for the first time providing a microbial fermentation product comprising of amylase in combination with dried animal plasma protein. Pigs, when fed the supplement of the present invention experienced a 40% increase in gain and a 30% better feed efficiency than pigs fed a control diet with animal plasma protein in a normal pig starter ration.

It is an object of the present invention to provide a protein-enzyme feed supplement which will increase weight gain and feed efficiency for young animals.

Another object of the invention is to provide a combination of animal plasma protein with amylase which when spray dried together results in a feed supplement which will aid the growth rate of pigs and improve their feed efficiency.

SUMMARY OF THE INVENTION

This invention provides for the first time a dried animal plasma protein enzyme supplement which works to increase weight gain and feed efficiency of the young pig. According to the present invention animal plasma protein is combined with a microbial fermentation product with a significant level of amylase activity. The resulting combination is then spray dried and added to feed of piglets from two to seven weeks of life. The combination of protein, amylase and the process of spray drying acts synergistically to provide a supplement which works better than feed with either of the components alone. Pigs so treated with the supplemented food of the invention experienced significant increase in weight gain as well as a much improved feed efficiency compared with an animal plasma protein supplemented control pig starter ration.

DETAILED DESCRIPTION OF THE INVENTION

Amylase is a term for a class of enzymes which split or hydrolyze starch. Basically the enzyme converts starch into maltose which may be readily utilized by the animal for energy. Amylase is secreted by the pancreas and hydrolyzes internal $\alpha$ 1,4 linkages in starch to yield maltose. Maltose is then hydrolyzed by maltase into two glucose residues.

While not wishing to be bound by any theory, it is suspected that the presence of spray dried animal plasma in the intestine activates or increases activity of maltase and lactase allowing for increased absorption of these nutrients. Additionally for whatever reason the act of spray drying animal plasma and combining the animal plasma with amylase is shown to have drastic increases in weight gain the feed efficiency for pigs so fed. Traditional enzyme and even enzyme protein combinations without spray drying experience no greater effects than traditional feeding as recommended by the NRC (National Research Council) Nutrient Requirements of Swine, Ninth revised edition 1988.

Briefly according to the present invention animal plasma protein is collected and prepared for spray drying using standard techniques. The spray dried plasma is then co-dried with amylase (a bacterial/fermentation residue containing amylase), in the amount of approximately 80 to 1200 grams of amylase to approximately 2000 pounds of dried plasma animal protein. The two ingredients are blended, put through a low heat flash spray dryer, added to traditional pig feed which is subsequently pelletized and then fed to pigs free choice.

The two basic components of the invention are generally known and commonly available as well as the mechanism for spray drying. However, briefly, the mechanism of spray drying the plasma/amylase combination is as follows.

According to the present invention, plasma obtained from animal sources is co-spray dried with amylase to form a powder-like substance which is then fed with other feed ingredients to young piglets. The plasma is obtained by collecting blood from animals, preferably pigs or cows. For example, blood is collected at slaughter plants. As it is collected, the blood is held in a circulating stainless steel tank with anticoagulants such as sodium citrate or sodium phosphate to avoid clotting. The whole blood is then separated, likely by centrifugation into two parts, cellular material (red corpuscles, white corpuscles and platelets) and plasma. Plasma is composed of about 60% albumin and about 40% globulin. After separation the plasma is cooled to 45° F. to retard growth of bacteria and stored in an insulated tanker until ready to dry.

The plasma component is then further concentrated 2 to 3 fold by membrane filtration. At this stage the microbial fermentation extract containing primarily amylase is added. The mixture is blended for 10 minutes and finally is co-dried to form a beige powdery substance. Spray drying should occur at temperatures low enough to maintain the highly digestible proteins but high enough to purify the dry powder eliminating bacterial and viral contamination. Traditionally the drier inlet temperature of approximately 375° to 400° F. and an outlet temperature from the drier is an estimated 180°-200° F. The resulting powdery substance may then be combined with other feed ingredients for the desired feeding regime.

Spray dried animal plasma protein has traditionally been used as a high quality protein used as a replacement for milk proteins due to its high quality protein and immunoglobulin content. This plasma has also been used in the feed industry as a feed supplement ingredient for veal and calf milk replacers, aquaculture and pet food for its influence on voluntary feed intake and efficient gains equal to or better than milk proteins. The animal plasma protein powder contemplated for use in this invention is comprised of high levels of amino acids. A typical amino acid assay of the powder by acid hydrolysis and subsequent column chromatography results in the following amino acid concentrations in grams per 100 grams of protein:

|  | From Beef Sources | From Pork Sources |
| --- | --- | --- |
| Alanine | 8.00 | 4.36 |
| Aspartic Acid | 10.07 | 9.21 |
| Arginine | 5.18 | 6.23 |

-continued

|  | From Beef Sources | From Pork Sources |
| --- | --- | --- |
| Cystine | 1.08 | 3.24 |
| Phenylalanine | 5.10 | 5.36 |
| Glycine | 5.20 | 3.53 |
| Glutamic Acid | 11.91 | 12.81 |
| Histidine | 4.63 | 3.62 |
| Isoleucine | 2.90 | 2.84 |
| Leucine | 9.88 | 8.05 |
| Lysine | 8.93 | 8.83 |
| Methionine | 1.40 | 0.77 |
| Proline | 5.44 | 5.92 |
| Serine | 5.25 | 5.59 |
| Threonine | 5.90 | 5.98 |
| Tryptophan | .74 | 1.93 |
| Tyrosine | 3.45 | 5.07 |
| Valine | 7.32 | 5.96 |

Chemical and other properties of the powdered protein include 70-80% protein, 7% moisture, 2% fat, 7% carbohydrates, pH 9, aqueous solubility 90% minimum; salmonella negative, standard plate count less than 20,000 per gram; and molecular weight range 40,000 to 820,000 daltons.

It is important to note that moisture levels must be kept at a minimum during spray drying and the powder should be stored in moisture resistant containers.

Spray dried animal plasma is commercially available from several sources including American Meat Protein Corporation product AP920 TM.

As used in this invention the term amylase means microbial fermentation extract, from Bacillus subtilis which includes amylase as well as other enzymes characteristic of the bacterial extract. Products as these are commercially available from several sources including Hanson's Laboratory, Inc., Agri Business Products Division, Milwaukee, Wis. (BIOMATE AMYLASE).

EXAMPLES

According to the present invention 2000 pounds of animal plasma was co-dried with 400 grams of amylase (BIOMATE AMYLASE CHR Hanson's Lab Inc.) the resulting powder was then combined in a pig starter diet according to the NRC, Nutrient Requirements of Swine, Ninth revised edition 1988, which was then pelleted. Ration analysis is as follows:

TABLE 1

| THE EFFECT OF AP920 ON PIG PERFORMANCE | | |
| --- | --- | --- |
| RATION ANALYSIS | PHASE 1 (PIGS FROM 21 to 31 DAYS OF AGE) | |
| CORN % | 46.7 | 46.7 |
| SOYBEAN MEAL | 15.25 | 15.25 |
| WHEY % | 20 | 20 |
| AP920 % | 8 | — |
| AP920 + (AMYLASE) % | — | 8 |
| PROTEIN % | 20 | 20 |
| LYSINE % | 1.5 | 1.5 |
| CALCIUM % | 0.85 | 0.85 |
| PHOSPHORUS % | 0.65 | 0.65 |
| M.E.Kcal./lb | 1460 | 1460 |

Piglets were then separated equally in 36 pens at random. Ninety 21 day-old (immediately after weaning) pigs were fed a ration containing spray dried animal plasma (AP920) which was co-dried with amylase while an additional 90 pigs were fed feed supplemented with spray dried animal plasma protein as the control pigs and were fed these rations for a period of 10 days.

The feeding results are shown in Table 2.

TABLE 2

| FEEDING RESULTS | CONTROL | SUPPLEMENTED |
|---|---|---|
| | (PIGS FROM 21-31 DAYS OF AGE) | |
| PENS/TRT. | 18 | 18 |
| PIG/TRT. | 90 | 90 |
| INITIAL WEIGHT | 11.7 lbs | 11.6 lbs |
| | (5.307003 kg) | (5.2616672 kg) |
| A.D.G. | 0.53 lbs | 0.77 lbs*** |
| | (.24040376 kg) | (.34926584 kg) |
| FEED INTAKE | 0.82 lbs | 0.88 lbs |
| | (.3719 kg) | (.3991612856 kg) |
| FEED/GAIN | 1.58 | 1.17*** |

***The treatments were significantly different at the <0.01 level

As can be seen from Table 2, pigs which received the spray dried animal plasma which was co-spray dried with amylase increased average daily gain by 45%; increased feed intake by 7.3%; and improved feed efficiency by 26% when compared with the control which was simply fed spray dried animal plasma in the ration.

Additionally these numbers are highly significant when compared with the National Research Counsel's Nutrient Requirement of Swine, Ninth Revised Edition, 1988. performance for pigs of this weight. According to the NRC the expected weight gain in grams per day for a 5 to 10 kg (5.3 kg) pig is 250 grams per day weight gain. Pigs treated with the spray dried animal plasma supplemented traditional rations experienced approximately the normal weight gain of 240 grams per day. However those treated with the animal plasma spray dried with amylase experienced a weight gain of approximately 350 grams per day. Additionally feed intake, expected to be 460kg per day, was less than expected at approximately 400 grams per day. Thus feed efficiency (feed/gain) expected to be 1.84 was actually improved to 1.17.

Pigs which received the amylase in combination with animal plasma which was co-spray dried experienced better daily gain feed intake and feed efficiency than those which merely had the animal plasma by itself indicating some sort of synergistic effect between the amylase and animal plasma protein that is co-spray dried. Additionally pigs treated with the co-dried substance were significantly better performers and surpassed the NRC estimates of performance on a similar ration.

The exact method earlier described was repeated on a group of 180 pigs for a period of 3-6 weeks post weaning. One group of pigs received the animal plasma and amylase which was merely blended and the other control received a normal control ration. The results are seen in Table 3.

TABLE 3

| | AMYLASE BLENDED | CONTROL |
|---|---|---|
| NUMBER OF PIGS | 90 | 90 |
| AVERAGE STARTING WEIGHT LBS. | 12.7 | 12.7 |
| AVERAGE DAILY GAIN LBS. | 0.917 | 0.917 |
| FEED INTAKE LBS. | 1.12 | 1.14 |
| FEED/GAIN LBS. | 1.22 | 1.26 |

Based on the data from this trial there was no difference in daily gain, feed intake or feed efficiency. Clearly the spray drying of the animal plasma protein and amylase is essential for the benefits of the invention.

From the results it can be seen that when the amylase and the animal plasma protein are merely blended and not spray dried results are no different from the control. Thus it can be deduced that there is something significant for the invention in the process of spray drying the two products together.

Tables 4 and 5 disclose results of similar tests run on pigs with varying levels of amylase per 2000 pounds of dried plasma.

TABLE 4

| PIG PERFORMANCE (0-7 DAYS) | | | | | | |
|---|---|---|---|---|---|---|
| LEVEL OF* AMYLASE/TON COMPLETE RATION | 0.0 | 0.5 | 1.0 | 1.5 | 2.0 | 2.5 |
| # OF PIGS | 24 | 24 | 24 | 24 | 24 | 24 |
| STARTING WEIGHT LBS. | 13.67 | 13.70 | 13.68 | 13.71 | 13.65 | 13.57 |
| A.D.G. LBS. | 0.51 | 0.65 | 0.60 | 0.66 | 0.71 | 0.80 |
| FEED INTAKE LBS. | 0.61 | 0.77 | 0.63 | 0.64 | 0.74 | 0.69 |
| FEED/GAIN LBS | 1.23 | 1.29 | 1.06 | 0.96 | 1.10 | 0.86 |

*1. is equal to 815,000 starch liquifying units/ton of ration
***+56% IMPROVEMENT IN AVERAGE DAILY GAIN.
***+13% IMPROVEMENT IN FEED INTAKE.
***+30% IMPROVEMENT IN FEED/GAIN RATIO.

TABLE 5

| PIG PERFORMANCE (0-14 DAYS) | | | | | | |
|---|---|---|---|---|---|---|
| LEVEL OF* AMYLASE/TON OF COMPLETE RATION | 0.0 | 0.5 | 1.0 | 1.5 | 2.0 | 2.5 |
| # OF PIGS | 24 | 24 | 24 | 24 | 24 | 24 |
| STARTING WEIGHT LBS. | 13.67 | 13.70 | 13.68 | 13.71 | 13.65 | 13.57 |
| A.D.G. LBS. | 0.54 | 0.66 | 0.58 | 0.61 | 0.67 | 0.71 |
| FEED INTAKE LBS. | 0.76 | 0.93 | 0.78 | 0.84 | 0.88 | 0.89 |
| FEED/GAIN LBS | 1.52 | 1.40 | 1.38 | 1.37 | 1.31 | 1.25 |

*1 is equal to 815,000 starch liquifying units/ton of feed
***+33% IMPROVEMENT IN AVERAGE DAILY GAIN.
***+16% IMPROVEMENT IN FEED INTAKE.
***+19.2% IMPROVEMENT IN FEED/GAIN RATIO.

As can be seen increasing levels of the amylase up to 2.5 per ton of starter feed experience a 56% improvement in average daily gain, 13% improvement in feed intake and 30% improvement in feed/gain ratio when pigs were studied during the first 7 days of life with increasing levels of amylase with a constant level of spray dried animal plasma protein.

Table 5 shows similar results for increasing amylase with constant plasma in pig performance evaluation from 0 to 14 days.

While not wishing to be bound by any theory, it is hypothesized that the act of co-spray drying the protein with the animal plasma places the amylase and plasma in a more bioavailable form thus improving food utilization and daily gain.

Tables 6 and 7 disclose the effects of varying levels of co-dried animal plasma and amylase as compared to the total pig ration. Table 6 discloses the ration analysis and table 7 discloses the performance of pigs fed varying percentages of the supplement as compared to total food.

TABLE 6

| RATION ANALYSIS | PHASE 1 | | | | |
|---|---|---|---|---|---|
| AP920 and *BIOMATE AMYLASE | 0.0 | 2.5 | 5.0 | 7.5 | 10.0 |
| WHEY % | 20 | 20 | 20 | 20 | 20 |
| PROTEIN % | 20 | 20 | 20 | 20 | 20 |
| LYSINE % | 1.5 | 1.5 | 1.5 | 1.5 | 1.5 |
| CALCIUM % | 0.84 | 0.84 | 0.84 | 0.84 | 0.85 |
| PHOSPHORUS % | 0.65 | 0.65 | 0.65 | 0.65 | 0.65 |

TABLE 6-continued

| RATION ANALYSIS | PHASE 1 | | | | |
|---|---|---|---|---|---|
| M.E.Kcal/lb | 1479 | 1477 | 1471 | 1464 | 1457 |

*contains 815,000 starch liquifying units/ton of starter diet

TABLE 7

| RATION ANALYSIS | 0-14 DAYS PERFORMANCE | | | | |
|---|---|---|---|---|---|
| % AP920 | 0.0 | 2.5 | 5.0 | 7.5 | 10.0 |
| NO. PIGS/TRT. | 30 | 30 | 30 | 30 | 30 |
| A.D.G. lbs. | 0.40 | 0.41 | 0.51 | 0.64 | 0.62 |
| FEED INTAKE lbs. | 0.63 | 0.55 | 0.69 | 0.72 | 0.68 |
| FEED/GAIN lbs. | 1.64 | 1.53 | 1.38 | 1.13 | 1.10 |

As can be seen from results it appears the response in gain and feed to gain ratio increases until the level of plasma at a constant amylase level reaches 7.5% in the ration and then it levels off. Thus it appears the ideal ration percentage is 7.5% of the ration. From all of the foregoing it can be seen the invention accomplishes at least all of its objectives.

What is claimed is:

1. A feed supplement for newborn animals comprising amylase and animal plasma protein which are co-spray dried together, said amylase in an amount of about 80 to 1200 grams per 2000 pounds of dried plasma.

2. The supplement of claim 1 wherein said supplement is added to an animal feed composition containing corn, soy, and whey and the resulting animal feed composition is pelleted.

3. The supplement of claim 1 wherein said amylase is in an amount of 400 grams per 2000 pounds of plasma.

4. The supplement of claim 1 wherein said amylase is a microbial fermentation product.

5. The microbial fermentation product of claim 3 wherein said microbe is *Bacillus subtilis*.

6. The supplement of claim 2 wherein said resulting animal feed composition comprises 1 to 10 percent of said supplement.

7. The supplement of claim 6 wherein said resulting animal feed composition comprises 7.5 percent of said supplement.

8. A method of increasing weight gain and improving feed efficiency of young animals comprising: feeding said young animals a feed supplement comprising about 80 to 1200 grams of amylase to 2000 pounds of dried animal plasma protein, said amylase and plasma being co-dried by spray drying.

9. The method of claim 8 wherein said supplement is added to an animal feed composition in an amount of 1 to 10 percent to produce a resulting animal feed composition.

10. The method of claim 9 wherein said resulting animal feed composition comprises 7.5 percent of said supplement.

11. The method of claim 8 wherein said supplement is fed to the animals during the first two to seven weeks of life.

12. The method of claim 8 wherein said animal is a pig.

13. The method of claim 8 wherein said feeding is after pigs are two weeks to seven weeks of age.

14. The method of claim 8 wherein said amylase is a bacterial fermentation product.

15. The method of claim 8 further comprising the step of:
    blending said plasma and amylase for approximately 10 minutes prior to being co-dried by spray drying.

16. The method of claim 8 further comprising the step of:
    adding said supplement to an animal feed composition to produce a resulting animal feed composition and then pelletizing said resulting animal feed composition.

17. A feed supplement product of amylase and animal plasma protein produced by the process of mixing said plasma and amylase in an amount of approximately 80 to 1200 grams of amylase per 2000 pounds of plasma and then spray drying said mixture.

18. The product of claim 17 wherein said amylase is in an amount of 400 grams per 2000 pounds of plasma.

* * * * *